(12) United States Patent
Yonemoto et al.

(10) Patent No.: US 11,650,532 B2
(45) Date of Patent: May 16, 2023

(54) DOCUMENT CONVEYANCE DEVICE, DOCUMENT READING DEVICE AND IMAGE FORMING APPARATUS

(71) Applicant: KYOCERA Document Solutions Inc., Osaka (JP)

(72) Inventors: Satoru Yonemoto, Osaka (JP); Seiji Okada, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 98 days.

(21) Appl. No.: 17/245,312

(22) Filed: Apr. 30, 2021

(65) Prior Publication Data
US 2021/0349415 A1 Nov. 11, 2021

(30) Foreign Application Priority Data
May 7, 2020 (JP) .............................. JP2020-081868

(51) Int. Cl.
*G03G 15/00* (2006.01)
*B65H 7/20* (2006.01)
*B65H 5/16* (2006.01)
*H04N 1/00* (2006.01)
*B65H 5/06* (2006.01)

(52) U.S. Cl.
CPC .......... *G03G 15/602* (2013.01); *B65H 5/062* (2013.01); *B65H 5/16* (2013.01); *B65H 7/20* (2013.01); *G03G 15/607* (2013.01); *H04N 1/00713* (2013.01); *H04N 1/00785* (2013.01)

(58) Field of Classification Search
CPC .... G03G 15/602; G03G 15/607; B65H 5/062; B65H 5/16; B65H 7/20; B65H 2405/32; H04N 1/00713; H04N 1/00785; H04N 1/0057; H04N 1/00647
See application file for complete search history.

(56) References Cited

FOREIGN PATENT DOCUMENTS

JP      2011-020783 A    2/2011
JP      2013249198 A * 12/2013

* cited by examiner

*Primary Examiner* — Yaovi M Ameh
*Assistant Examiner* — Quang X Nguyen
(74) *Attorney, Agent, or Firm* — Studebaker & Brackett PC

(57) ABSTRACT

A document conveyance device includes a sheet feeding tray, a conveyance mechanism, a discharge tray, a document pressing member and a supporting mechanism. The document pressing member comes into contact with an upper face of the document discharged from a conveyance path and presses the document downward. The supporting mechanism is configured to be provided in the sheet feeding tray, to support the document pressing member, to allow a shifting of the document pressing member according to an operation for shifting the document pressing member in a discharge direction of the document or an opposite direction to the discharge direction and to inhibit the shifting of the document pressing member against a force applied to the document pressing member by the discharged document.

8 Claims, 11 Drawing Sheets

DOCUMENT CONVEYANCE DEVICE, DOCUMENT READING DEVICE AND IMAGE FORMING APPARATUS

INCORPORATION BY REFERENCE

This application is based on and claims the benefit of priority from Japanese Patent application No. 2020-081868 filed on May 7, 2020, which are incorporated by reference in its entirety.

TECHNICAL FIELD

The present disclosure relates to a document conveyance device which conveys a document to a reading position, a document reading device and an image forming apparatus which include the document conveyance device.

BACKGROUND

A document conveyance device which conveys a document to a reading position is known. The document conveyance device conveys the document along a conveyance path via the document reading position, and then discharges the document on a discharge tray. However, if the document is discharged randomly, variations in a position and a posture of the document occur and it becomes difficult to take the document out of the discharge tray. Further, work for aligning the edges of the taken out documents is required. Then, a technique for suppressing the variations in a position and a posture of the discharged document has been discussed. For example, a document pressing member which comes into contact with an upper surface of the discharged document and presses the document downward may be provided.

Such a document pressing member applies a load on a discharge operation because it generates friction between the document pressing member and the upper surface of the document. In order to prevent the load from being increased excessively, the document pressing member may preferably come into contact with near a downstream side end portion of the document in a discharge direction and then stop the document at a suitable position. However, in a case where the document pressing member is provided at a position where a specific size document is assumed, the document pressing member does not function for a document having a length shorter than a length of the specific size in the discharge direction. On the other hand, in the case of a document having a length longer than the specific size, it is conceivable that the previously discharged document is pushed out by a frictional force because the load on the discharge operation is increased and a time during which the document to be discharged later is rubbed against the previously discharged document is prolonged. When the pressing force of the document pressing member is increased in order to prevent the document from being pushed out, the document to be discharged later may be blocked and retained. On the other hand, when the pressing force of the document pressing member is decreased, the effect of suppressing the variations in a position and a posture of the document may be reduced.

SUMMARY OF THE INVENTION

In order to solve the above problems, a document conveyance device according to the present disclosure includes a sheet feeding tray, a conveyance mechanism, a discharge tray, a document pressing member and a supporting mechanism. On the sheet feeding tray, a document is placed. The conveyance mechanism is configured to convey the document fed from the sheet feeding tray along a conveyance path via a reading position. The discharge tray is provided below the sheet feeding tray, and on the discharge tray, the document discharged from the conveyance path is stacked. The document pressing member comes into contact with an upper face of the document discharged from the conveyance path and presses the document downward. The supporting mechanism is configured to be provided in the sheet feeding tray, to support the document pressing member, to allow a shifting of the document pressing member according to an operation for shifting the document pressing member in a discharge direction of the document or an opposite direction to the discharge direction and to inhibit the shifting of the document pressing member against a force applied to the document pressing member by the discharged document.

A document reading device according to the present disclosure includes the document conveyance device and produces an image data by reading a document conveyed to the reading position by the document conveyance device.

An image forming apparatus according to the present disclosure includes the document conveyance device; a document reading device which reads a document conveyed to the reading position by the document conveyance device and produces an image data; and an image forming device which forms an image on a sheet using the produced image data.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

Hereinafter, with reference to the attached drawings, a multifunctional peripheral 100 (an example of an image forming apparatus) according to one embodiment of the present disclosure will be described. The multifunctional peripheral 100 includes a printer 1, an image scanner 15 (an example of a document reading device) and a document conveyance device 13.

Figure 1:
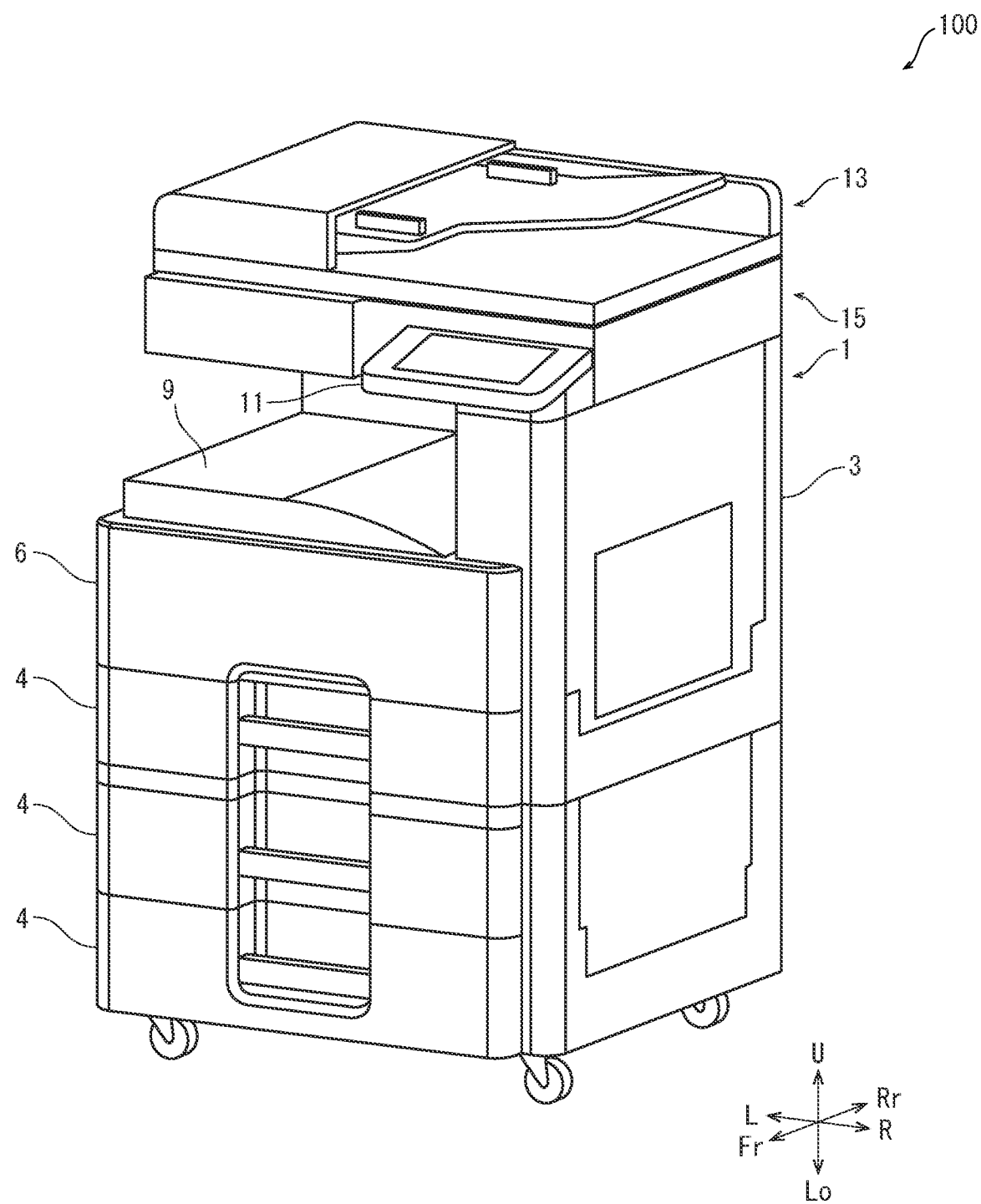
FIG. 1 is a perspective view showing a multifunctional peripheral according to one embodiment of the present disclosure.
Figure 2:
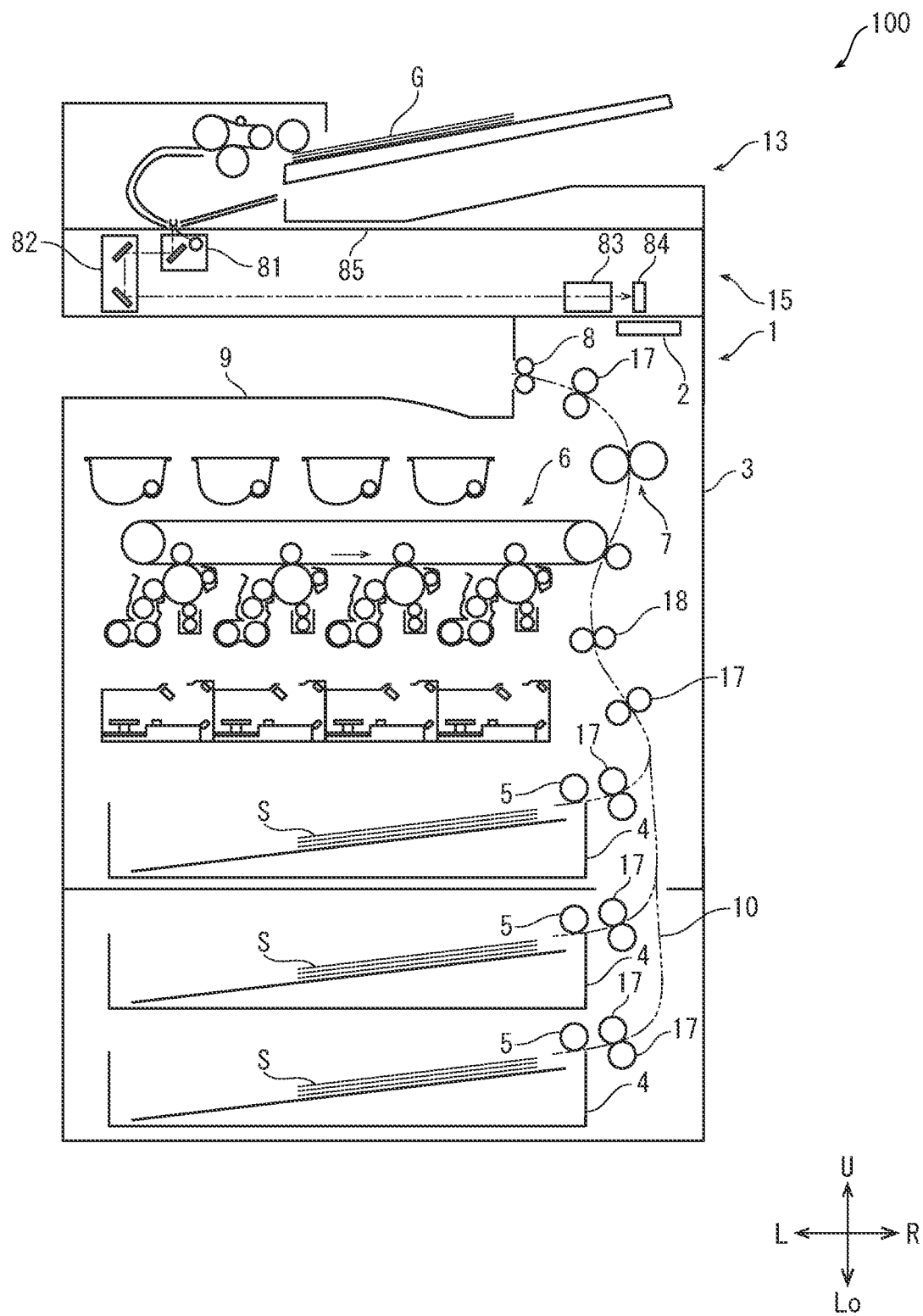
FIG. 2 is a front view schematically showing an inner structure of the multifunctional peripheral according to the embodiment of the present disclosure.

First, an entire structure of the multifunctional peripheral 100 will be described. FIG. 1 is a perspective view showing the multifunctional peripheral 100. FIG. 2 is a front view schematically showing an inner structure of the multifunctional peripheral 100. Hereinafter, a front side of a paper plane on which FIG. 2 is drawn is defined as a front side of the multifunctional peripheral 100, and a left-and-right direction is described based on a direction in which the multifunctional peripheral 100 is viewed from the front side. U, Lo, L, R, Fr and Rr marked in each drawing indicate an upper, a lower, a left, a right, a front and a rear, respectively.

The printer 1 includes a parallelepiped shaped main housing 3. In a lower portion of the main housing 3, a sheet feeding cassette 4 in which a sheet S is stored and a sheet feeding roller 5 which feeds the sheet S from the sheet feeding cassette 4 are provided. Above the sheet feeding cassette 4, an image forming device 6 which forms a toner image in an electrophotographic manner and a fixing device 7 which fixes the toner image on the sheet S are provided. In an upper portion of the main housing 3, a discharge rollers pair 8 which discharges the sheet S having the fixed toner image and a stack tray 9 on which the discharged sheet S is stacked are provided. Above the stack tray 9, the image scanner 15 and the document conveyance device 13 are provided. The image forming device 6 includes a photosensitive drum, a charging device, an exposure device, a development device, a transferring roller and a cleaning device. To the development device, a toner container which supplies a toner to the development device is connected.

Inside the main housing 3, a conveyance path 10 is provided so as to extend from the sheet feeding roller 5 to the discharge rollers pair 8 through the image forming device 6 and the fixing device 7. On the conveyance path 10, a plurality of conveyance rollers pairs 17 which convey the sheet S are provided. On an upstream side of the image forming device 6 in a conveyance direction, a resist rollers pair 18 is provided.

Each part of the multifunctional peripheral 100 is controlled by a control part 2. The control part 2 may be achieved by a processor and a software, or a hardware such as an integrated circuit. The processor reads a program stored in a memory and executes it to perform various processing. As the processer, for example, a CPU (a central processing unit) is used. The memory includes a storage medium such as a ROM (a read only memory), a RAM (a random access memory), an EEPROM (an electrically erasable programmable read only memory). The memory stores a control program used for controlling each part of the multifunctional peripheral 100.

On a front side of the image scanner 15, an operation panel 11 is provided. The operation panel 11 includes a display panel, a touch panel provided on a display face of the display panel, and a key pad disposed adjacent to the display panel. The control part 2 displays a massage showing an operation menu for the printer 1 and the image scanner 15 on the display panel, and controls each part of the multifunctional peripheral 100 according to an operation detected by the touch panel and the key pad.

When an image forming job is input to the multifunctional peripheral 100 from an external computer, the sheet feeding roller 5 feeds the sheet S from the sheet feeding cassette 4 to the conveyance path 10, then the resist rollers pair 18 whose rotation is stopped corrects a skew of the sheet S and then feeds the sheet S to the image forming device 6 at a predetermined timing. In the image forming device 6, the charging device charges the photosensitive drum at a predetermined potential, the exposure device writes an electrostatic latent image on the photosensitive drum, the development device develops the electrostatic latent image using the toner supplied from the toner container to form a toner image, and then the transferring roller transfers the formed toner image to the sheet S. Then, the fixing device 7 heats the toner image and fixes it on the sheet S, and then the discharge rollers pair 8 discharges the sheet S on the stack tray 9. The cleaning device removes the toner remaining on the photosensitive drum.

Next, the image scanner 15 will be described. The image scanner 15 includes a first carriage 81 containing a light source and a reflection mirror, a second carriage 82 containing two reflection mirrors, a lens 83 imaging light, an imaging element 84 which converts the imaged light into an image data, and a contact glass 85 on which the document G is placed.

When a user places the document G on an upper face of the contact glass 85 and provides a reading instruction to the image scanner 15, the light source emits light to the document G, the first carriage 81 moves rightward at a speed V and the second carriage 82 moves rightward at a speed V/2 with the moving of the first carriage 81. The light reflected on the document G is reflected on the reflection mirror of the first carriage 81, reflected on the reflection mirrors of the second carriage 82, introduced to the lens 83, and imaged on the imaging element 84. The imaging element 84 inverts the reflected light into an image data and then outputs the image date to the control part 2 of the printer 1.

Figure 3:
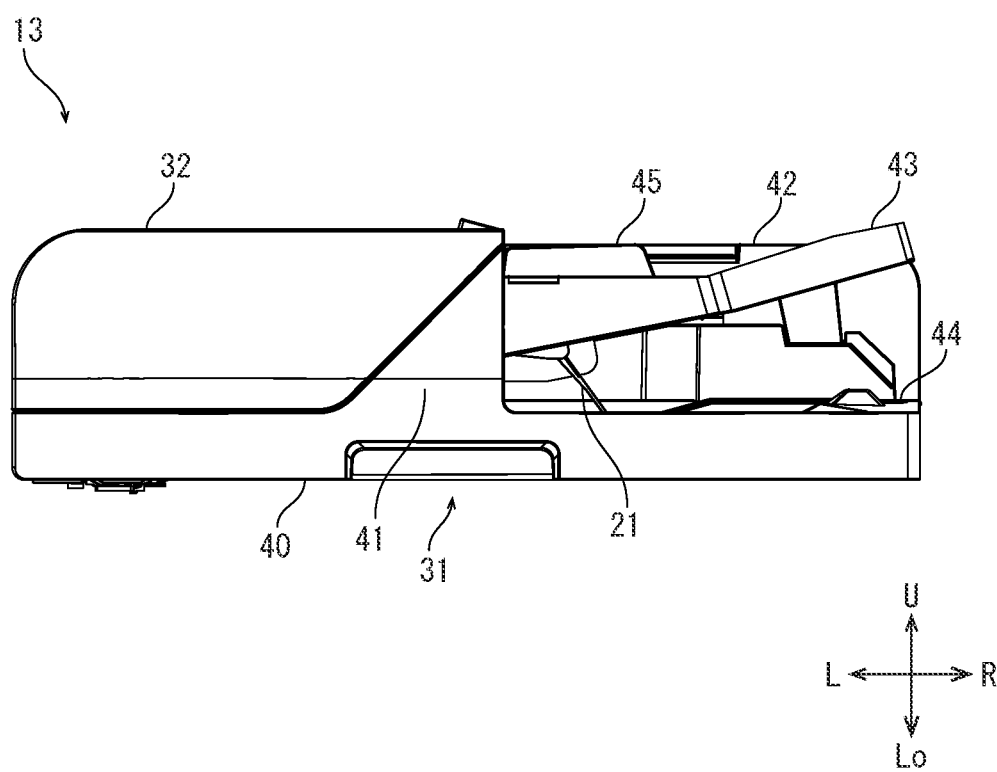
FIG. 3 is a front view showing a document conveyance device according to the embodiment of the present disclosure.
Figure 4:
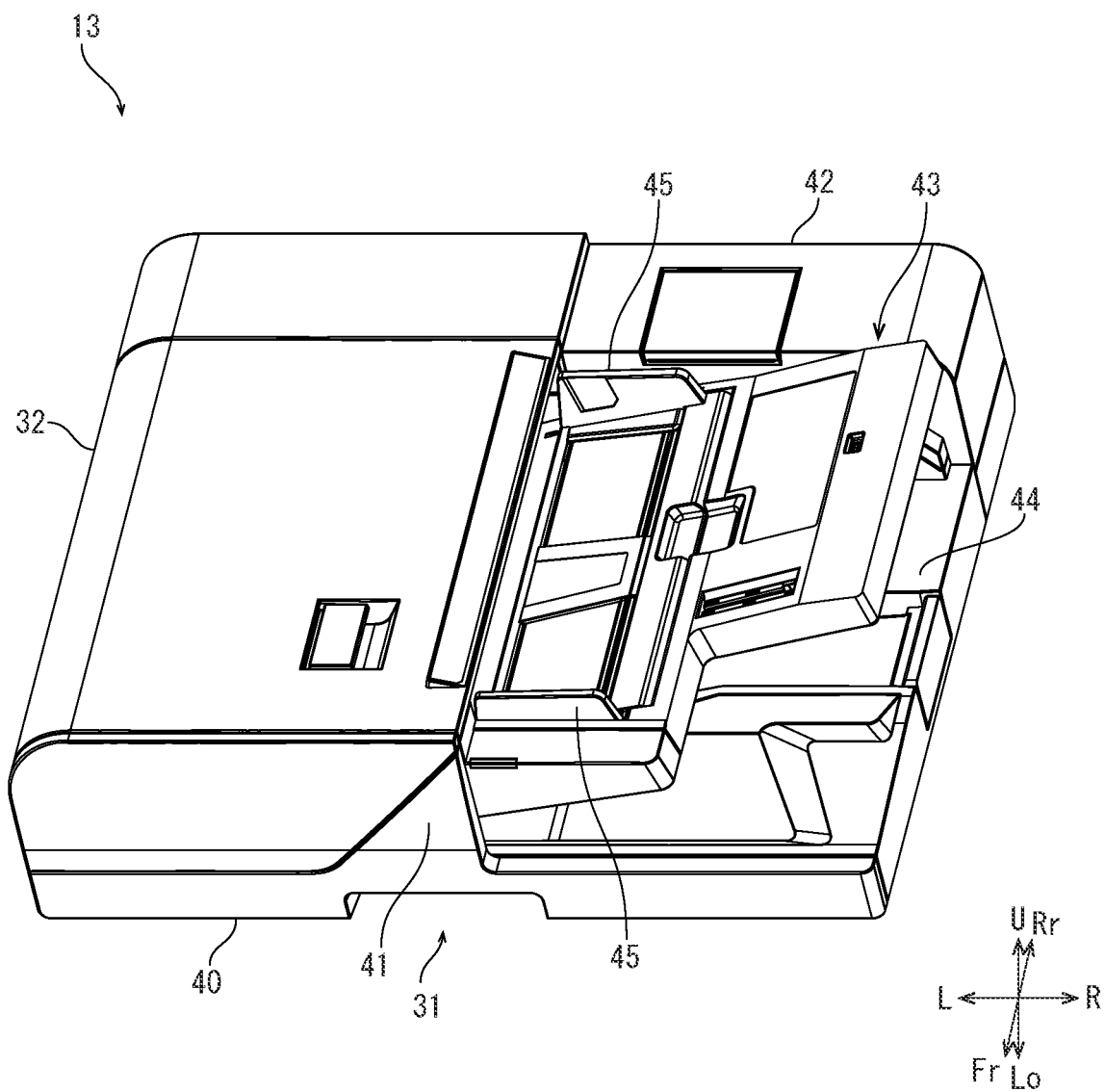
FIG. 4 is a perspective view showing the document conveyance device according to the embodiment of the present disclosure.
Figure 5:
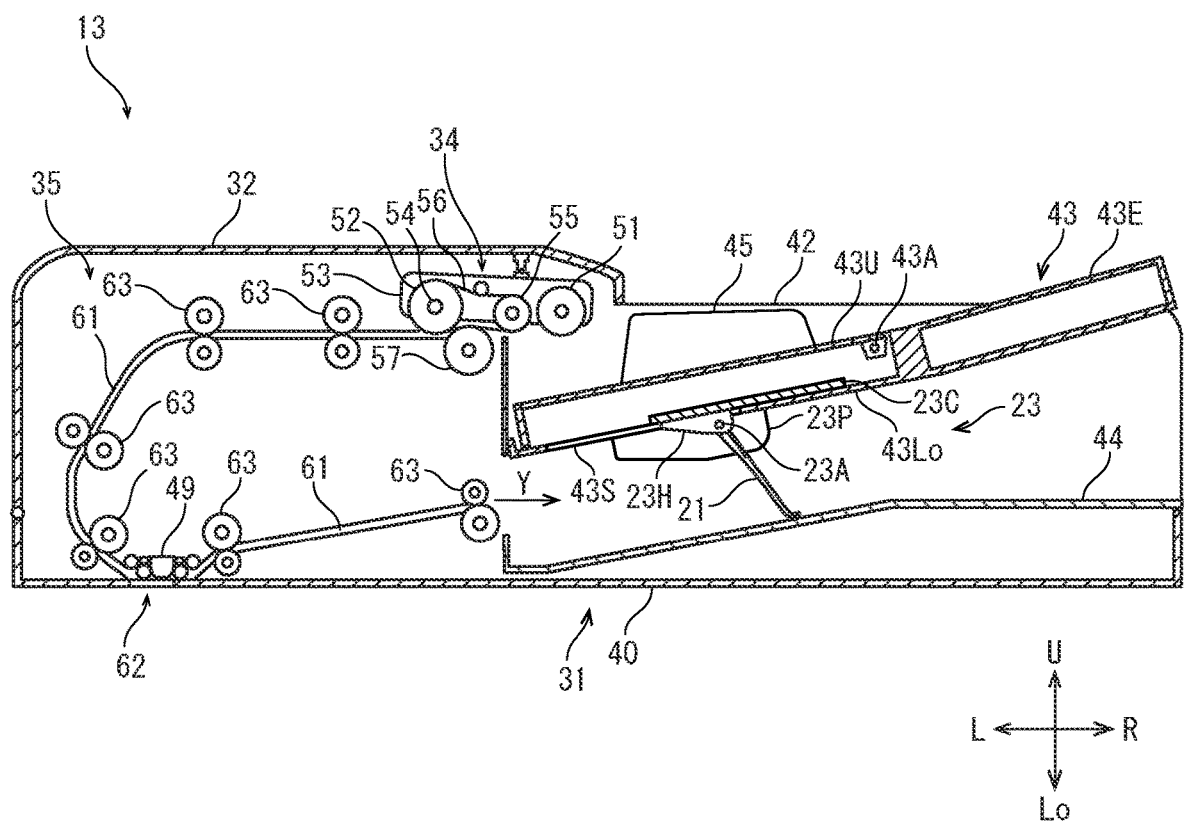
FIG. 5 is a sectional view showing the document conveyance device according to the embodiment of the present disclosure.
Figure 6A:
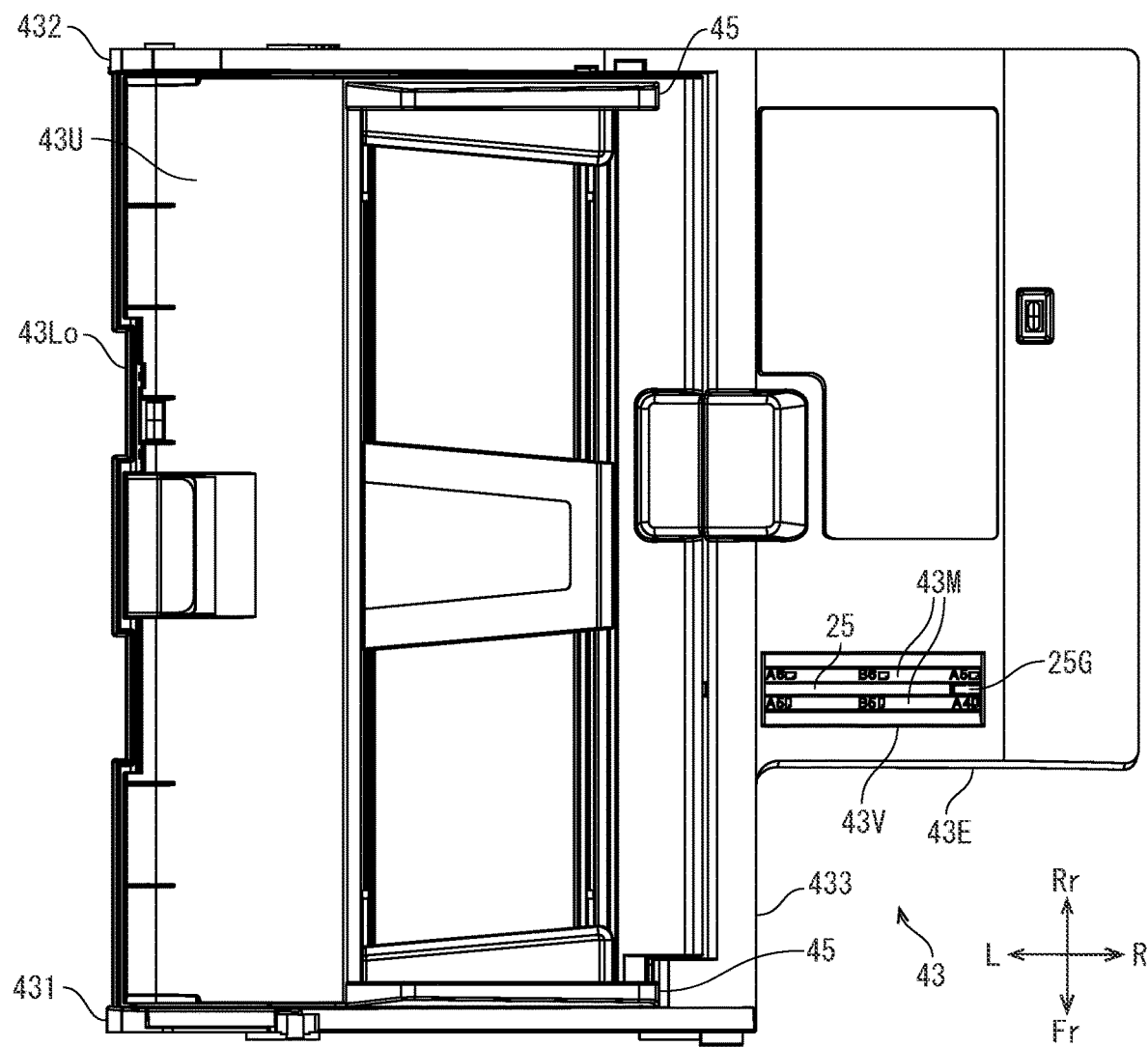
FIG. 6A is a plan view showing a sheet feeding tray according to the embodiment of the present disclosure.
Figure 6B:
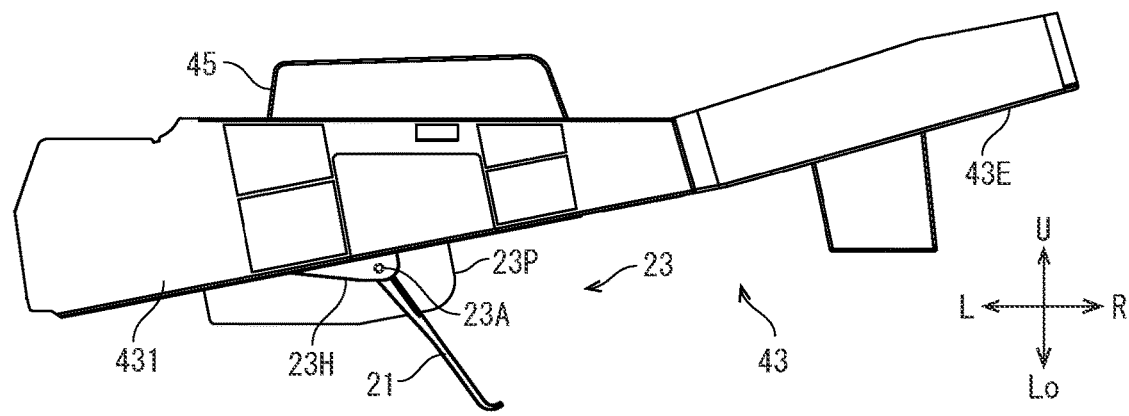
FIG. 6B is a front view showing the sheet feeding tray according to the embodiment of the present disclosure.
Figure 7A:
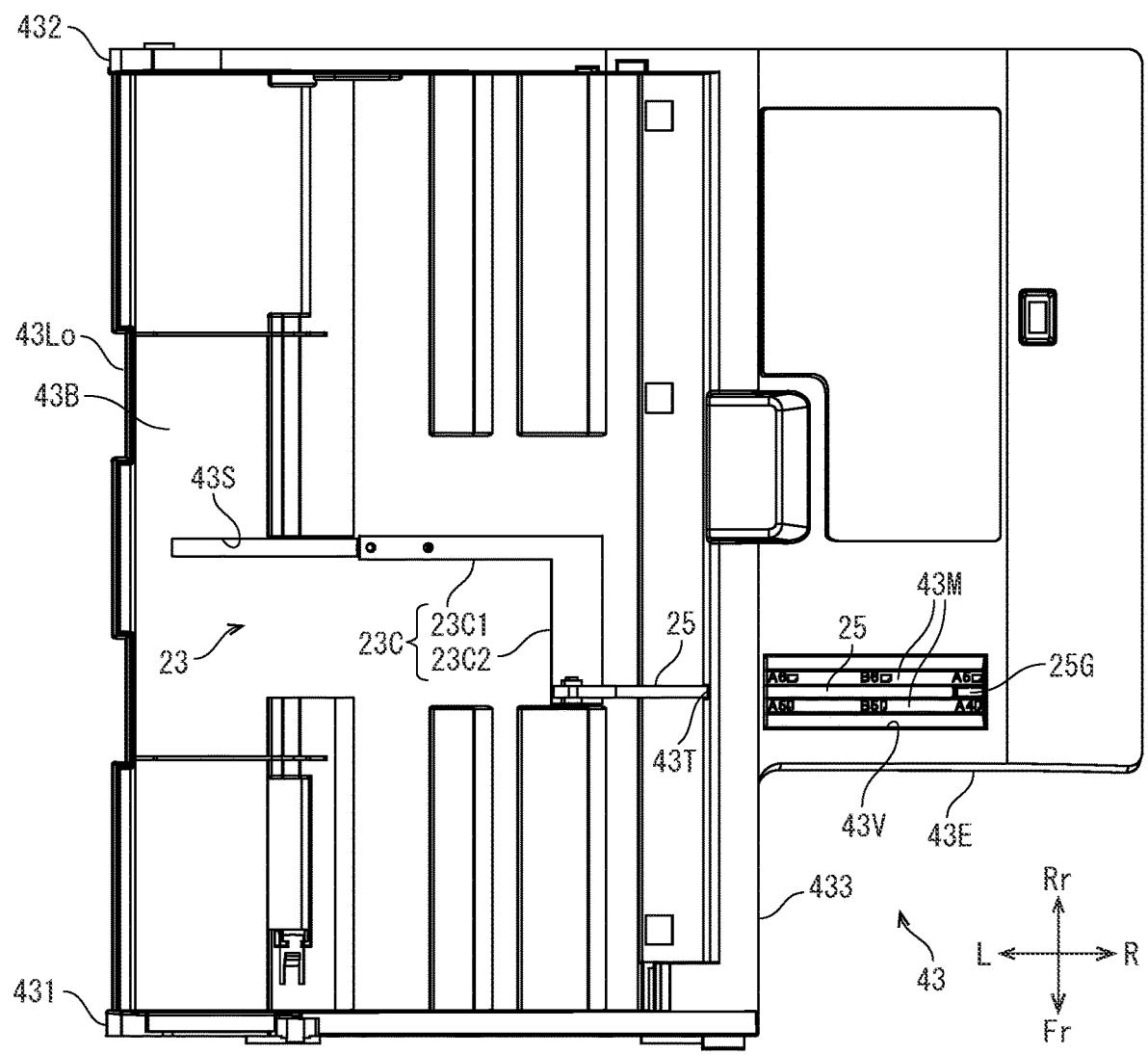
FIG. 7A is a plan view showing the sheet feeding tray according to the embodiment of the present disclosure, in a state where an upper layer part is detached.
Figure 7B:
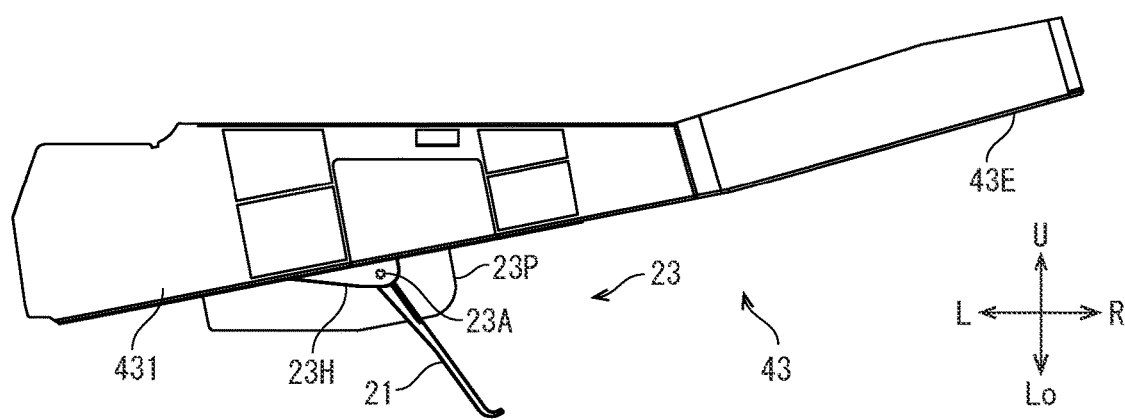
FIG. 7B is a front view showing the sheet feeding tray according to the embodiment of the present disclosure, in the state where the upper layer part is detached.
Figure 8:
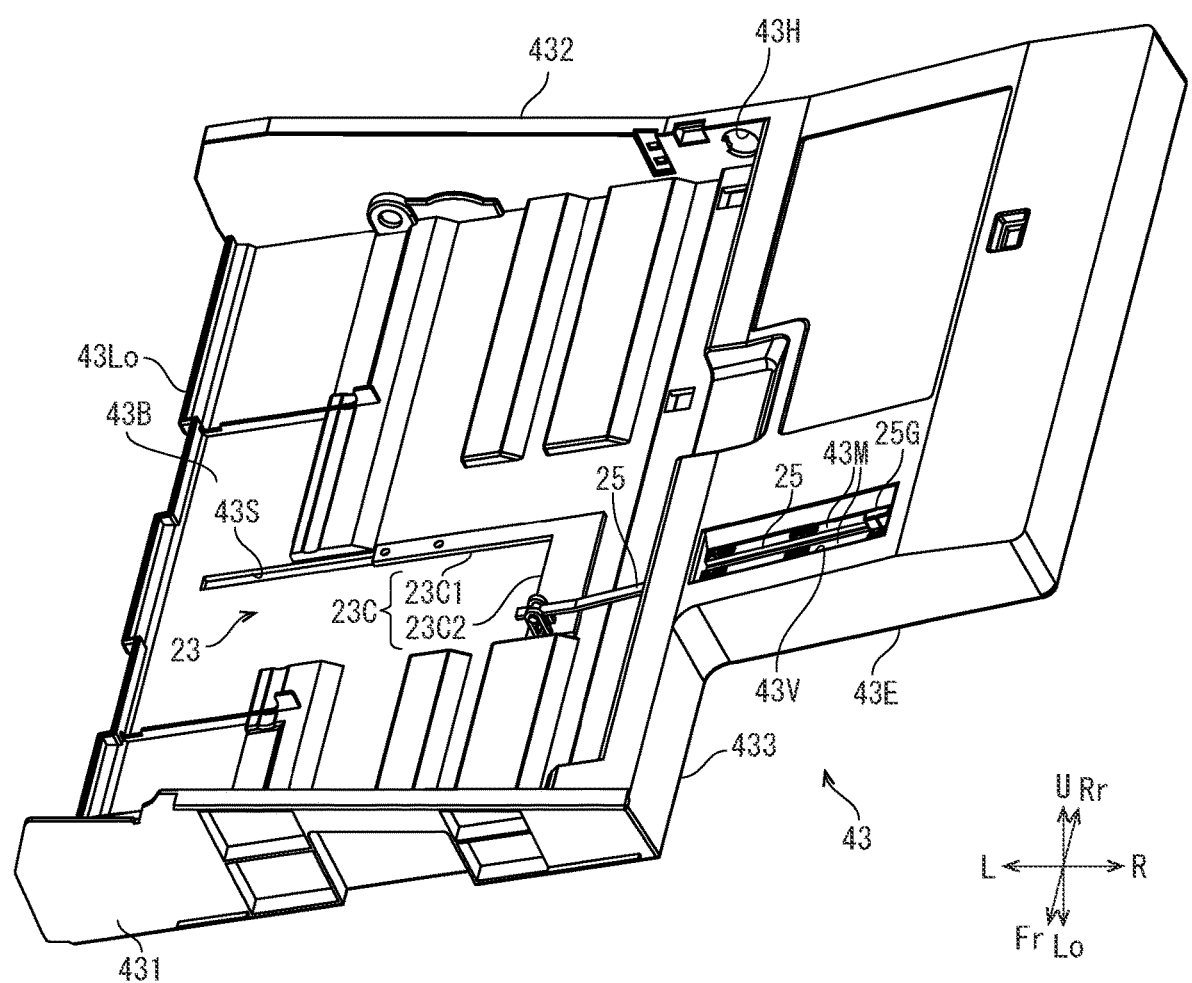
FIG. 8 is a perspective view showing the sheet feeding tray according to the embodiment of the present disclosure, in the state where the upper layer part is detached.
Figure 9A:
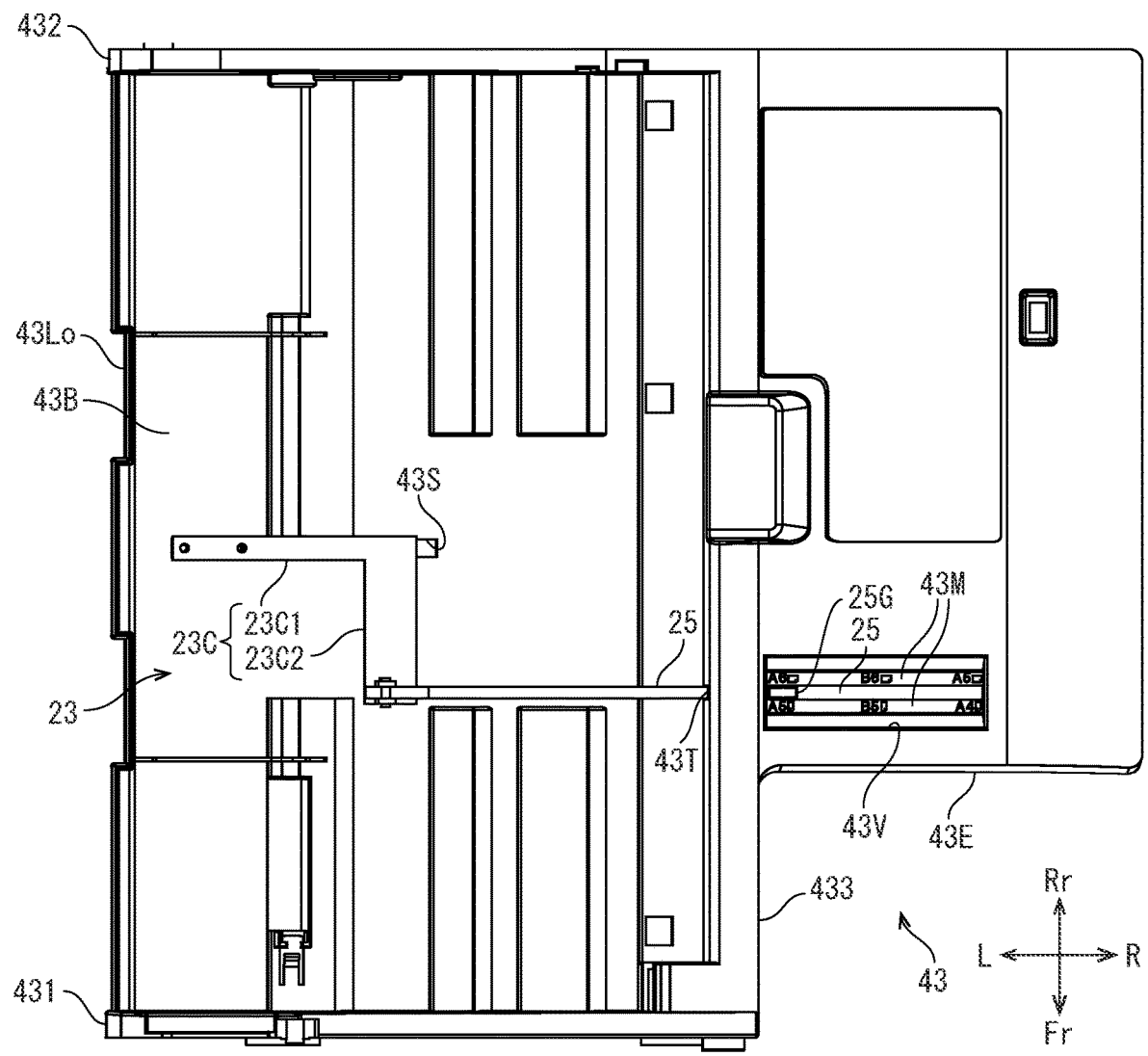
FIG. 9A is a plan view showing the sheet feeding tray according to the embodiment of the present disclosure, in the state where the upper layer part is detached.
Figure 9B:
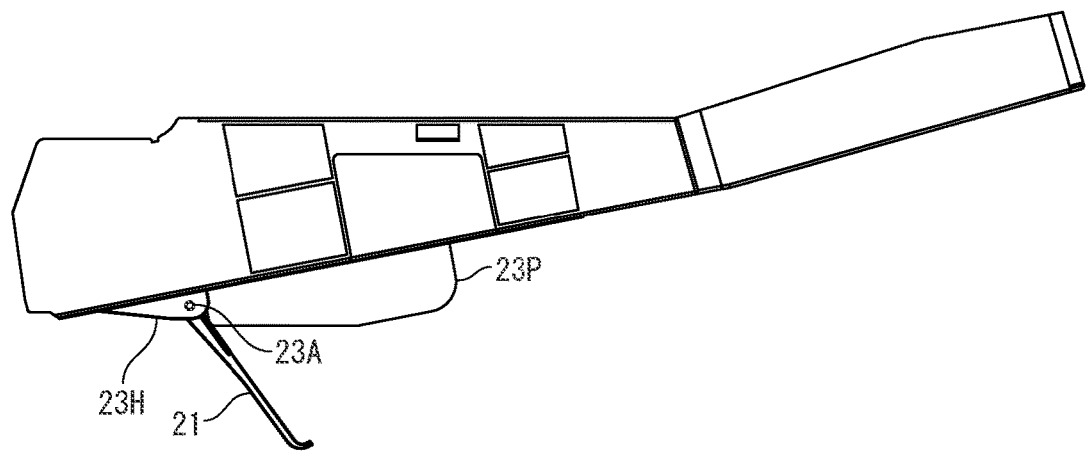
FIG. 9B is a front view showing the sheet feeding tray according to the embodiment of the present disclosure, in the state where then upper layer part is detached.
Figure 10:
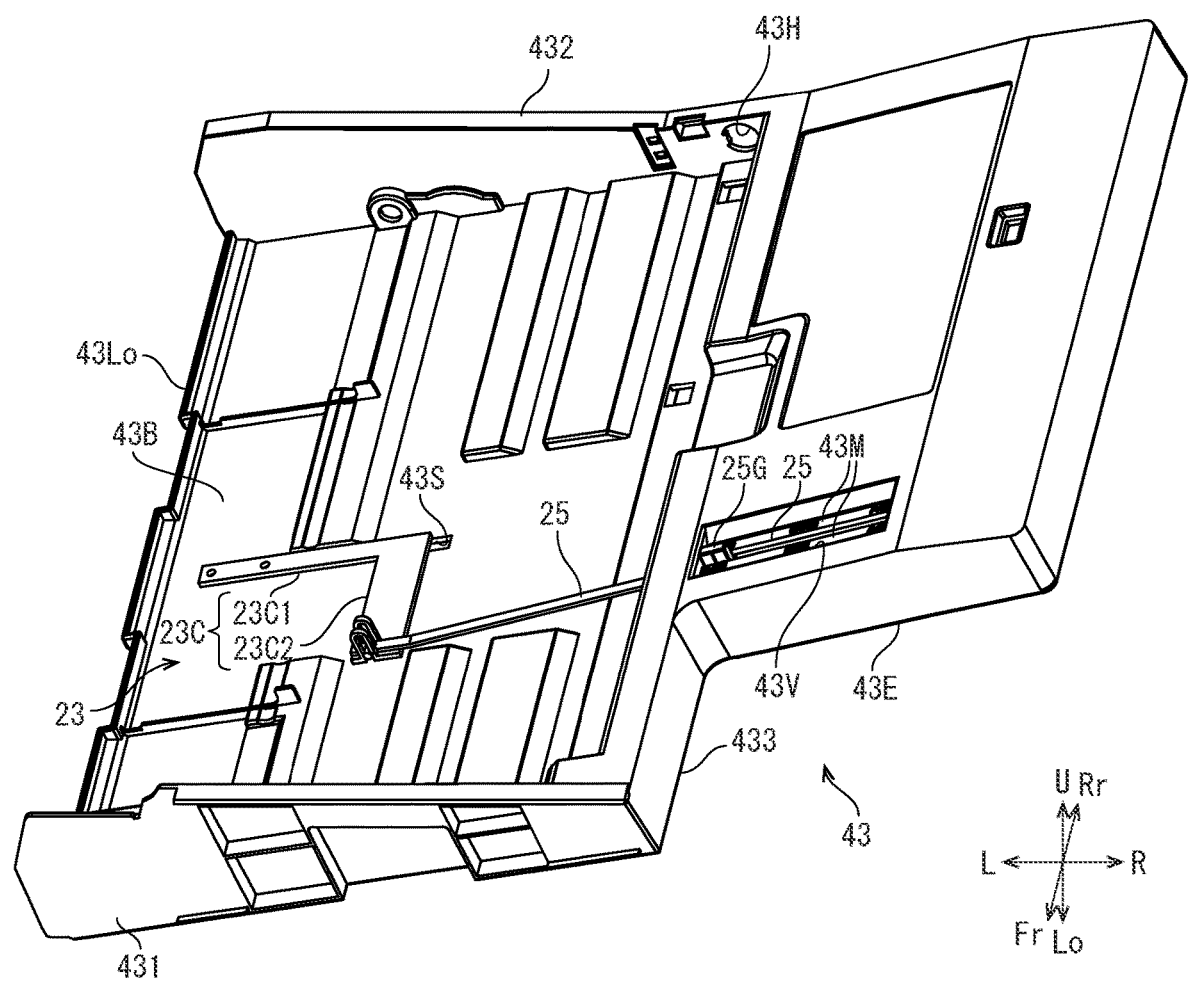
FIG. 10 is a perspective view showing the sheet feeding tray according to the embodiment of the present disclosure, in the state where the upper layer part is detached.

Next, the document conveyance device 13 will be described. FIG. 3 is a front view showing the document conveyance device 13. FIG. 4 is a perspective view showing the document conveyance device 13. FIG. 5 is a sectional view showing the document conveyance device 13. FIG. 6A is a plan view showing a sheet feeding tray 43. FIG. 6B is front view showing the sheet feeding tray 43. FIG. 7A is a plan view showing the sheet feeding tray 43 from which an upper layer part 43U is detached. FIG. 7B is a front view showing the sheet feeding tray 43 from which the upper layer part 43U is detached. FIG. 8 is a perspective view showing the sheet feeding tray 43 from which the upper layer part 43U is detached. FIG. 9A is a plan view showing the sheet feeding tray 43 from which the upper layer part 43U is detached. FIG. 9B is a front view showing the sheet feeding tray 43 from which the upper layer part 43U is detached. FIG. 10 is a perspective view showing the sheet feeding tray 43 from which the upper layer part 43U is detached. FIG. 6A to FIG. 8 show a state where an operation member 25 is in a first position. FIG. 9A to FIG. 10 show a state where the operation member 25 is in a third position.

The document conveyance device 13 includes the sheet feeding tray 43 on which the document G is placed, a feed roller 51 which feeds the document G on the sheet feeding tray 43 one by one, a conveyance mechanism 35 configured to convey the fed document G along a conveyance path 61 via a reading position 62 and a discharge tray 44 disposed below the sheet feeding tray 43 and on which the document G discharged from the conveyance path 61 is stacked.

[Main body] A main body 31 (see FIG. 3 to FIG. 5) has a flat-shaped bottom part 40, a first wall part 41 and a second wall part 42 facing each other in the front-and-rear direction (a width direction of the document G crossing to the conveyance direction of the document G). A rear edge portion of the main body 31 is hinge-coupled to the image scanner 15 on a rear side of the contact glass 85 (see FIG. 1), and the main body 31 functions as a pressing plate which presses the document G on the contact glass G downward. The first wall part 41 is provided along a left half portion of a front edge portion of the bottom part 40, and the second wall part 42 is provided along an entire portion of a rear edge portion of the bottom part 40.

[Sheet feeding tray] The sheet feeding tray 43 is provided above the bottom part 40. As shown in FIG. 5 to FIG. 8, the sheet feeding tray 43 includes a box-shaped lower layer part 43Lo whose upper face is opened, a plate-shaped upper layer part 43U provided above the lower layer part 43Lo, and an extension part 43E provided on the right side of the lower layer part 43Lo. The lower layer part 43Lo has a bottom portion 43B, a first wall portion 431, a second wall portion 432 and a third wall portion 433 which are provided along a front end portion, a rear end portion and a right end portion of the bottom portion 43B, respectively. In right end portions of front and rear edge portions of the upper layer part 43U, turning shafts 43A are protruded in the front-and-rear direction (see FIG. 5). In right end portions of the first wall portion 431 and the second wall portion 432, supporting holes 43H by which the turning shafts 43A are supported are provided (see FIG. 8). The upper layer part 43U is turnable around the turning shafts 43A.

A rear face of the extension part 43E and a rear face of the lower layer part 43Lo are continuously formed in the left-and-right direction. A front face of the extension part 43E is positioned on the rear side of a front face of the lower layer part 43Lo. Then, a width of the extension part 43E in the front-and-rear direction is shorter than a width of the lower layer part 43Lo in the front-end-rear direction. An upper face of the upper layer part 43U and an upper face of the extension part 43E are formed in a continuously inclined document placement face inclined downward toward the left side. The upper layer part 43U is provided with a pair of cursors 45 slidable in the front-and-rear direction, and the pair of cursors 45 positions the document G in the front-and-rear direction.

[Lifting and lowering mechanism] The first wall part 41 and the second wall part 42 have a lifting and lowering mechanism (not shown) configured to lift and lower the upper layer part 43U of the sheet feeding tray 43. The lifting and lowering mechanism includes an eccentric cam which comes into contact with the lower face of the upper layer part 43U, a motor and a gear train which transmits a drive force of the motor to the eccentric cam, for example. When the eccentric cam is rotated, the upper layer part 43U is turned around the turning shafts 43A (is lifted and lowered). The control part 2 controls the lifting and lowering mechanism such that the document G placed on the sheet feeding tray 43 is pressed on the feed roller 51.

[Discharge tray] The discharge tray 44 is provided on the upper face of the bottom part 40 (below the sheet feeding tray 43) (see FIG. 3 to FIG. 5). On a left portion of the discharge tray 44, an inclined face inclined downward toward the left side is provided.

[Feeding mechanism] A feeding mechanism 34 (see FIG. 5) is provided in a space between the first wall part 41 and the second wall part 42. The feeding mechanism 34 includes a box-shaped holder 53 whose lower face is opened. In the holder 53, the feed roller 51, a driven roller 55 provided on the left side of the feed roller 51, a drive roller 52 provided on the left side of the driven roller 55, a rubber belt 56 wound around the drive roller 52 and the driven roller 55, and an auxiliary roller 57 pressed on a lower face of a lower side portion of the belt 56.

The feed roller 51, the driven roller 55, the drive roller 52 and the auxiliary roller 57 are disposed with their axial directions along the front-and-rear direction. The feed roller 51 has a core metal and an elastic layer made of rubber (both are not shown). The driven roller 55, the drive roller 52 and the auxiliary roller 57 are made of resin. Both front and rear end portions of a drive shaft 54 of the drive roller 52 are supported by the first wall part 41 and the second wall part 42, and the drive shaft 54 is connected to a drive source such as a motor (not shown). The holder 53 is supported by the drive shaft 54, and turnable around the drive shaft 54. A drive force of the drive shaft 54 is transmitted to the feed roller 51 via a transmission mechanism such as a gear train and a timing belt (not shown).

[Convenance mechanism] The conveyance mechanism 35 includes the conveyance path 61 formed to be curved in an approximately U-shape from the feeding mechanism 34 to a position on the right upper side of the reading position via the reading position 62, and a plurality of conveyance rollers pairs 63 disposed on the conveyance path 61. The reading position 62 is a position where it faces the reflection mirror of the first carriage 81 (see FIG. 2) positioned at the home position. At the reading position 62, a shading plate 49 is provided, and a gap is formed between the shading plate 49 and the contact glass 85, through which the document G is passed. The image scanner 15 reads an image of the document G conveyed through the reading position 62.

The conveyance path 61 is formed between plate-shaped members facing each other via a gap through which the document G is conveyed. The conveyance rollers pair 63 includes a drive roller and a driven roller, and the drive roller is connected to a drive source such as a motor (not shown). Above the conveyance mechanism 35, a plate-shaped cover part 32 is provided so as to be openable and closable. A left lower end portion of the cover part 32 is hinge-coupled to a left end portion of the bottom part 40 of the main body 31.

Next, a document pressing member 21 and a supporting mechanism 23 will be described in detail. The document conveyance device 13 includes the document pressing member 21 and the supporting mechanism 23. The document pressing member 21 comes into contact with an upper face of the document G discharged from the conveyance path 61 and presses the document G downward. The supporting mechanism 23 is configured to be provided in the sheet feeding tray 43 and support the document pressing member 21 so as to allow a shifting of the document pressing member according to an operation for shifting the document pressing member 21 in the discharge direction of the document G or an opposite direction to the discharge direction and inhibit the shifting of the document pressing member 21 against a force acted on the document pressing member 21 from the discharged document G.

[Document pressing member] The document pressing member 21 is a rod-shaped member, and its upper end portion is supported by the supporting mechanism 23. The document pressing member 21 is supported in a posture where its lower end portion is on a downstream side of the upper end portion in the discharge direction of the document G (a Y direction in FIG. 5). The document pressing member 21 is turnable around a turning shaft 23A, and when the document G is not placed on the discharge tray 44, the document pressing member 21 rests in a posture where the lower end portion thereof comes into contact with the discharge tray 44 by gravity. When the document G is discharged on the discharge tray 44, the document pressing member 21 comes into contact with the upper face of the document G by gravity to press the document G downward.

[Supporting mechanism] The supporting mechanism 23 includes the turning shaft 23A, a holder 23H, a coupling member 23C, the operation member 25 and a slit 43S. The document pressing member 21 is coupled to the holder 23H by the turning shaft 23A whose axial direction is along the front-and-rear direction, and turnable relative to the holder 23H around the turning shaft 23A. The slit 43S whose longitudinal direction is along the left-and-right direction is formed in an approximately center portion of the bottom portion 43B of the lower layer part 43Lo in the front-and-rear direction (see FIG. 5 and FIG. 7A). The slit 43S has a width corresponding to a thickness of the holder 23H in the front-and-rear direction, and an upper portion of the holder 23H is inserted into the slit 43S. On a rear side of the slit 43S, a protection part is provided so as to protect the holder 23H and the document pressing member 21.

An upper end portion of the holder 23H is coupled to the plate-shaped coupling member 23C. The coupling member 23C has a first portion 23C1 whose longitudinal direction is along the left-and-right direction and a second portion 23C2 extending forward from the right end portion of the first portion 23C1. The first portion 23C1 has a width in the front-and-rear direction larger than a width of the slit 43S. The coupling member 23C comes into contact with the upper face of the bottom portion 43B of the lower layer part 43Lo.

On the upper face of the extension part 43E of the sheet feeding tray 43, a recess 43V is provided. The recess 43V is positioned on a front side of the slit 43S in the front-and-rear direction. In other words, the recess 43V is provided on a user operation side of the sheet feeding tray 43. In the recess 43V, marks 43M are displayed so as to indicate a position of the operation member 25 for each document G having different size. In the embodiment, the marks 43M are displayed at a first position corresponding to a A4 landscape document conveyance and a A5 portrait document conveyance, a second position corresponding to a B5 landscape document conveyance and a B6 portrait document conveyance and a third position corresponding to a A5 landscape document conveyance and a A6 portrait document conveyance. The mark 43M is provided in a manner such as a sticker and a relief formed by injection molding. The landscape document conveyance shows that the document G is conveyed in a posture where its longer edge crosses to the conveyance direction, and the portrait document conveyance shows that the document G is conveyed in a posture where its shorter edge crosses to the conveyance direction.

[Operation member] Using the operation member 25 coupled to the document pressing member 21 allows to shift the document pressing member 21 in the discharge direction or in an opposite direction to the discharge direction. The operation member 25 is a rod-shaped member whose longitudinal direction is along the left-and-right direction, and a grip 25G is provided in an upper portion of a right end portion. An upper end of the grip 25G is positioned on the same face as or lower than the upper face of the extension part 43E. In other words, the operation member 25 is provided so as not to protrude from the face (the document placement face) of the sheet feeding tray 43. In the third wall portion 433, a through hole 43T penetrating in the left-and-right direction is formed so as to communicate with the recess 43V. The operation member 25 is inserted into the through hole 43T, its left end portion is coupled to the second portion 23C2 of the coupling member 23C and its right end portion is positioned in the recess 43V. The operation member 25 is movable through the through hole 43T, and the holder 23H is movable along the slit 43S with the movement of the operation member 25. When the user grips the grip 25G and shifts the operation member 25 in the left-and-right direction, the document pressing member 21 shifts in the left-and-right direction (the discharge direction and the opposite direction to the discharge direction) with the movement of the operation member 25.

The supporting member 23 allows the shifting of the document pressing member 21 according to the operation for moving the operation member 25 in the discharge direction of the document G or in the opposite direction and inhibits the shifting of the document pressing member 21 against the force applied to the document pressing member 21 by the discharged document G. For example, the operation member 25 is pressed against the bottom face of the recess 43V by a leaf spring (not shown) provided in the through hole 43T of the third wall portion 433. Then, frictional resistance is generated between the operation member 25 and the bottom face of the recess 43V. The force generated by the frictional resistance is smaller than a force generated when the user grips the grip 25G and shifts the operation member 25 and larger than a force in the discharge direction applied to the document pressing member 21 by the discharged document G. Accordingly, although the operation member 25 and the document pressing member 21 shifts according to the user operation, the document pressing member 21 does not shift even if the discharged document G comes into contact with the document pressing member 21. The force in the discharge direction applied to the document pressing member 21 by the discharged document G may contain a force by which the document G pushes the document pressing member 21 toward the discharge direction when the tip edge of the document G comes into contact with the document pressing member 21, and a force by which the document G brings the document pressing member 21 in the discharge direction when the document G is discharged in a state where the document pressing member 21 comes into contact with the upper face of the document G.

The supporting mechanism 23 is configured such that resistance against the operation for shifting the document pressing member 21 is larger at positions corresponding to the different sizes of the document G than at the other position. For example, at the positions corresponding to the first position, the second position and the third position on the bottom face of the recess 43V, grooves whose longitudinal direction is along the front-and-rear direction and having a depth of about 1 mm are formed while one protrusion having a height of about 1 mm is formed on the bottom face of the grip 25G of the operation member 25 (both are not shown). When the projection is fitted into one of the grooves, the resistance against the operation for shifting the document pressing member 21 becomes larger than when the projection comes into contact with the portion other than the grooves, so that it becomes possible to stop the grip 25G at one of the first position, the second position and the third position. According to the configuration, it becomes possible to inhibit the shifting of the document pressing member 21 against a force applied to the document pressing member 21 by the discharged document G.

Figure 11A:
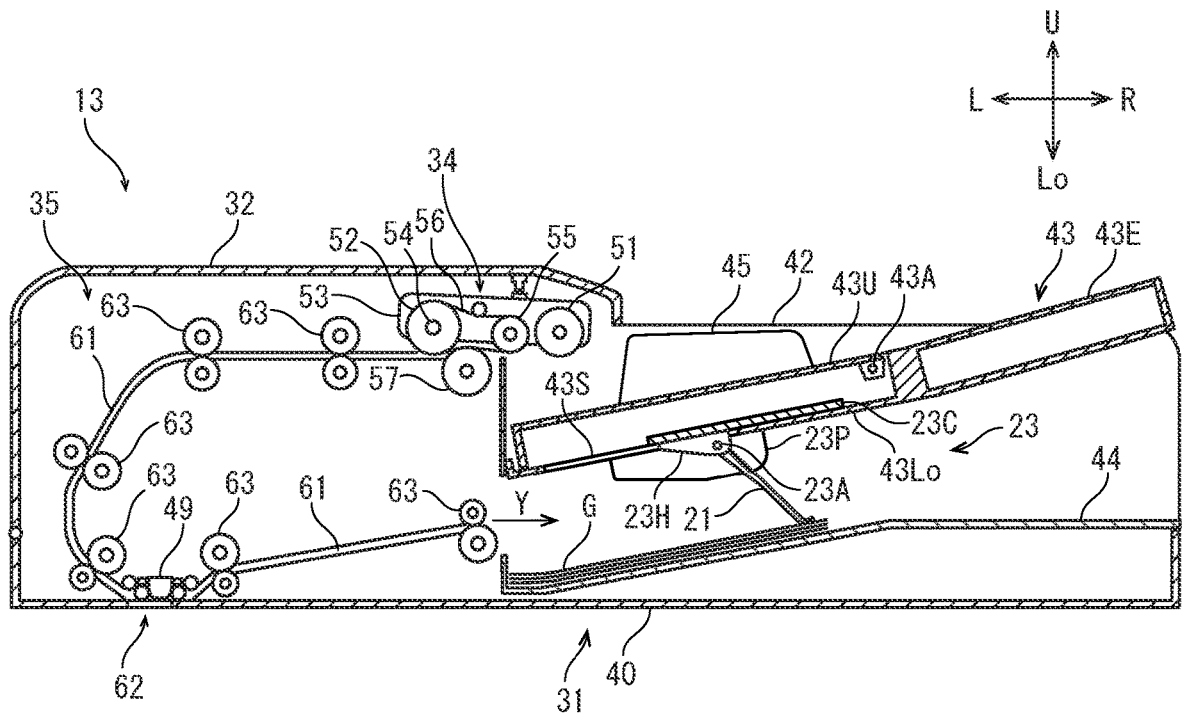
FIG. 11A is a sectional view showing the document conveyance device according to the embodiment of the present disclosure.
Figure 11B:
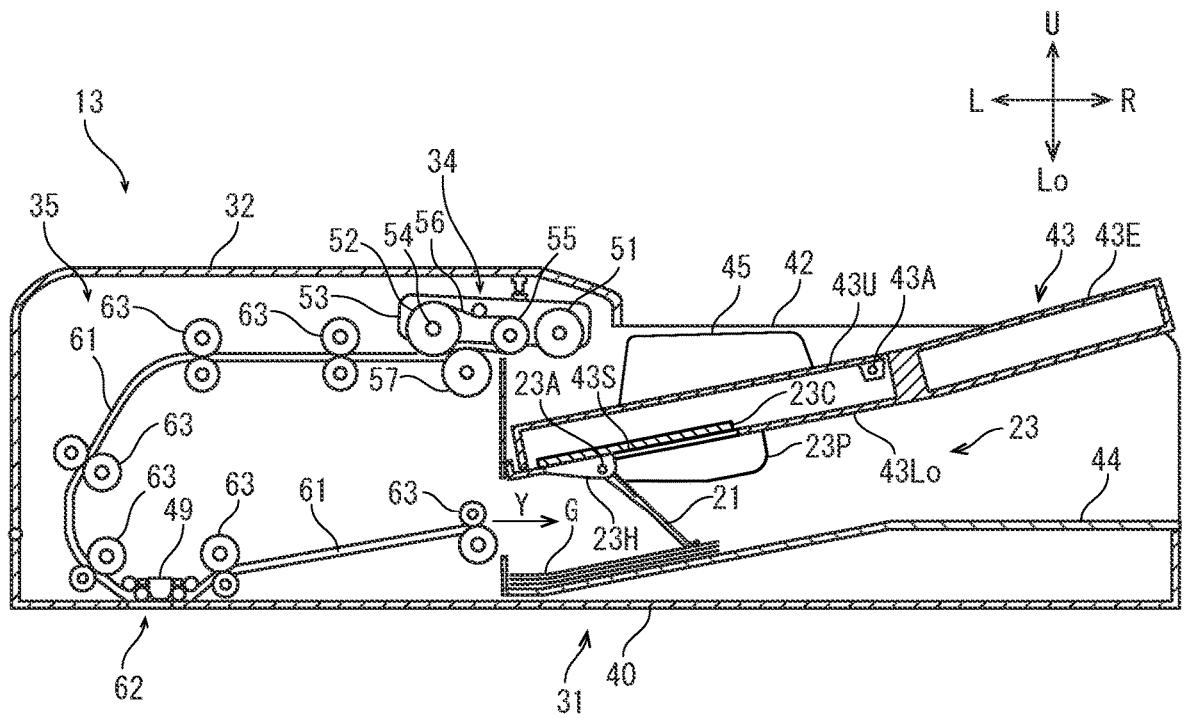
FIG. 11B is a sectional view showing the document conveyance device according to the embodiment of the present disclosure.

Next, an operation of the document pressing member 21 will be described. FIG. 11A and FIG. 11B are sectional views showing the document conveyance device 13.

When an A4 landscape size document or an A5 portrait size document is conveyed in a state where the document pressing member 21 is in the first position (see FIG. 7A to FIG. 8, FIG. 11A), the document G is stopped when the document pressing member 21 comes into contact with near the downstream side end portion of the document G in the discharge direction. Then, it becomes possible to inhibit the variations in a position and a posture of the discharged document G without increasing a load on the discharge operation.

On the other hand, when a A5 landscape size document or a A6 portrait size document is conveyed in a state where the document pressing member 21 is in the third position (see FIG. 9A to 10, FIG. 11B), the document G is stopped when the document pressing member 21 comes into contact with near the downstream side end portion of the document G in the discharge direction. Then, it becomes possible to inhibit the variations in a position and a posture of the discharged document G without increasing a load on the discharge operation.

When a B5 landscape size document or a B6 portrait size document is conveyed in a state where the document pressing member 21 is in the second position, the document G is stopped when the document pressing member 21 comes into contact with near the downstream side end portion of the document G in the discharge direction (the case is not shown). Then, it becomes possible to inhibit the variations in a position and a posture of the discharged document G without increasing a load on the discharge operation.

According to the document conveyance device 13 according to the present embodiment as described above, it becomes possible to inhibit the variations in a position and a posture of the discharged document G without increasing a load on the discharge operation regardless of a length of the document G in the discharge direction.

According to the document conveyance device 13 according to the present embodiment, it becomes possible to shift the document pressing member 21 to a position corresponding to a size of the discharged document G easily because the supporting mechanism 23 is configured such that the resistance against an operation for shifting the document pressing member 21 is larger at positions corresponding to different sizes of the document G than at the other position.

According to the document conveyance device 13 according to the present embodiment, it becomes possible to shift the document pressing member 21 easily because of being provided with the operation member 25.

According to the document conveyance device 13 according to the present embodiment, it becomes possible to shift the document pressing member 21 easily because the operation member 25 is provided on the upper face of the sheet feeding tray 43.

According to the document conveyance device 13 according to the present embodiment, it becomes possible to shift the document pressing member 21 easily because the operation member 25 is provided on the user operation side of the sheet feeding tray 43.

According to the document conveyance device 13 according to the present embodiment, it becomes possible to prevent the document pressing member 21 from being shifted due to accidental contact with the operation member 25 because the operation member 25 is not protruded from the sheet feeding tray 43.

The above embodiment may be modified as below.

The above embodiment shows an example where the supporting mechanism 23 is configured such that the resistance against an operation for shifting the document pressing member 21 is larger at positions corresponding to different sizes of the document G than at the other position, but the resistance against the operation for shifting the document pressing member 21 may be the same at the positions corresponding to the document sizes and at the other position.

The above embodiment shows an example where the document conveyance device 13 includes the operation member 25, but the document conveyance device 13 may not be provided with the operation member 25. In this case, the document pressing member 21 may be shifted when the user holds the document pressing member 21 or the holder 23H directly. In this case, the second portion 23C2 of the coupling member 23C is not required.

The above embodiment shows an example where the operation member 25 is provided on the upper face of the sheet feeding tray 43, but the operation member 25 may be provided on a side face of the sheet feeding tray 43.

The above embodiment shows an example where the operation member 25 is provided on the user operation side of the sheet feeding tray 43, but the operation member 25 may be provided on an opposite side to the user operation side of the sheet feeding tray 43.

The above embodiment shows an example where the operation member 25 is not protruded on the upper face of the sheet feeding tray 43, but the operation member 25 may be protruded from the sheet feeding tray 43.

The above embodiment shows an example where frictional resistance is generated between the operation member 25 and the bottom face of the recess 43V by the leaf spring provided in the through hole 43T, but it may be configured such that the shifting of the document pressing member 21 is inhibited by frictional resistance between the operation member 25 and the through hole 43I or frictional resistance between the holder 23H and the slit 43S without providing the leaf spring.

The above embodiment shows an example where the operation member 25 includes the grip 25G, but it may be configured such that a non-slip rough face is formed on the upper face of the operation member 25 and the operation member 25 may be shifted by pressing a user's finger on the rough face and then moving it with the user's finger without providing the grip 25G.

The above embodiment shows an example where the document pressing member 21 comes into contact with the upper face of the document G to press the document downward by gravity, but it may be configured such that the document pressing member 21 presses the document G downward by a biasing member such as a spring which biases the document pressing member 21 downward.

The above embodiment shows an example where the grooves are provided at the positions corresponding to the first position, the second position and the third position on the bottom face of the recess 43V while the projection is provided on the bottom face of the grip 25G of the operation member 25, but it may be configured such that the projection is formed on the bottom face of the recess 43V while the grooves are provided on the bottom face of the grip 25G. The grooves and the projection may be provided in another portion. For example, the grooves may be provided in a portion facing the coupling member 23C on the upper face of the lower layer part 43Lo of the sheet feeding tray 43 while the projection may be provided on the bottom face of the coupling member 23C. Alternatively, the grooves may be formed on a side face of the slit 43S while the projection may be formed on a side face of the holder 23H.

The above embodiment shows an example where the user operates the operation member 25 to shift the document pressing member 21, but the document conveyance device 13 may be configured so as to shift the document pressing member 21 according to a size of the document G. For example, a drive part to shift the document pressing member in the left-and-right direction and a sensor for detecting a size of the document G are provided in the sheet feeding tray 43 (both are not shown). The drive part may be a rack and pinion, a ball screw or a solenoid actuator. The control part 2 controls the drive part so as to shift the holder 23H to a position corresponding to a size of the document G detected by the sensor. According to the configuration, it becomes possible to shift the document pressing member 21 according to a size of the document G without a manual operation for shifting the document pressing member 21.

The present disclosure has been described with respect to specific embodiments, the present disclosure is not limited to the above embodiments. The above embodiment can be modified by those skilled in the art without departing from the scope and sprit of the present disclosure.

The invention claimed is:

1. A document conveyance device comprising:
a sheet feeding tray on which a document is placed;
a conveyance mechanism configured to convey the document fed from the sheet feeding tray along a conveyance path via a reading position;
a discharge tray provided below the sheet feeding tray and on which the document discharged from the conveyance path is stacked;
a document pressing member coming into contact with an upper face of the document discharged from the conveyance path and pressing the document downward; and
a supporting mechanism configured to be provided in the sheet feeding tray, to support the document pressing member, to allow a shifting of the document pressing member according to an operation for shifting the document pressing member in a discharge direction of the document or an opposite direction to the discharge direction and to inhibit the shifting of the document pressing member against a force applied to the document pressing member by the discharged document,
wherein the supporting mechanism includes:
an operation member coupled to the document pressing member and capable of shifting the document pressing member in the discharge direction or the opposite direction; and
a coupling member coupled to the operation member and movable along a slit formed on the sheet feeding tray along the discharge direction, and
the document pressing member is connected to the coupling member through the slit.

2. The document conveyance device according to claim 1, wherein
the supporting mechanism is configured such that resistance against the operation for shifting the document pressing member is larger at positions corresponding to the documents having different sizes than at the other position.

3. The document conveyance device according to claim 1, wherein
the operation member has a grip gripped by a user, and
the grip is stored in a recess provided on an upper face or a side face of the sheet feeding tray so as to not protrude from the upper surface or the side surface.

4. The document conveyance device according to claim 1, wherein
a force generated by frictional resistance between the operation member and the sheet feeding tray is smaller than a force for shifting the operation member and larger than a force applied to the document pressing member by the discharged document.

5. The document conveyance device according to claim 1, wherein
the operation member is provided on a user operation side of the sheet feeding tray.

6. The document conveyance device according to claim 1, wherein
the operation member is provided so as not to protrude from a document placement face of the sheet feeding tray.

7. A document reading device comprising the document conveyance device according to claim 1 and producing an image data by reading a document conveyed to the reading position by the document conveyance device.

8. An image forming apparatus comprising:
the document conveyance device according to claim 1;
a document reading device which reads a document conveyed to the reading position by the document conveyance device and produces an image data; and
an image forming device which forms an image on a sheet using the produced image data.

* * * * *